United States Patent [19]

Warner et al.

[11] Patent Number: 4,989,103
[45] Date of Patent: Jan. 29, 1991

[54] ADJUSTMENT OF POSITION SLOPE FOR DISK DRIVE SERVO USING HALF-TRACK POINT

[75] Inventors: Nicholas M. Warner, Livermore; Andrew M. Rose, Mountain View, both of Calif.

[73] Assignee: Unisys Corp., Detroit, Mich.

[21] Appl. No.: 483,975

[22] Filed: Feb. 20, 1990

Related U.S. Application Data

[63] Continuation of Ser. No. 21,098, Mar. 3, 1987, abandoned.

[51] Int. Cl.[5] .............................................. G11B 5/02
[52] U.S. Cl. .................................. 360/67; 360/77.02
[58] Field of Search ............ 360/27, 67, 77.02, 77.08; 369/32, 33

[56] References Cited

U.S. PATENT DOCUMENTS

| 4,511,938 | 4/1985 | Betts | 360/77 |
| 4,551,776 | 11/1985 | Roalson | 360/77 |
| 4,578,723 | 3/1986 | Betts et al. | 360/77 |

Primary Examiner—Aristotelis M. Psitos
Assistant Examiner—David L. Robertson
Attorney, Agent, or Firm—John J. McCormack; Mark T. Starr

[57] ABSTRACT

In a disk drive servo, position slope is adjusted automatically, by referencing on the amplitude of position signals at the "half-track point".

9 Claims, 2 Drawing Sheets

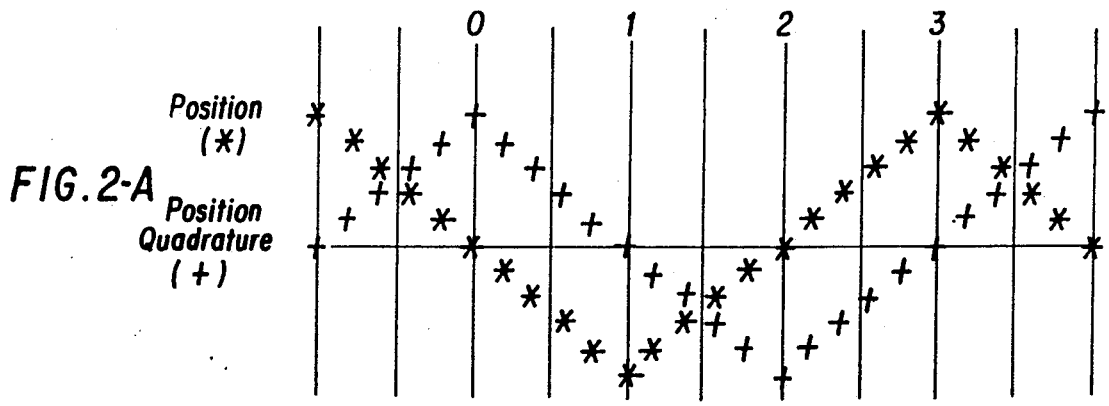
FIG. 2-A  Position (✱)
Position Quadrature (+)
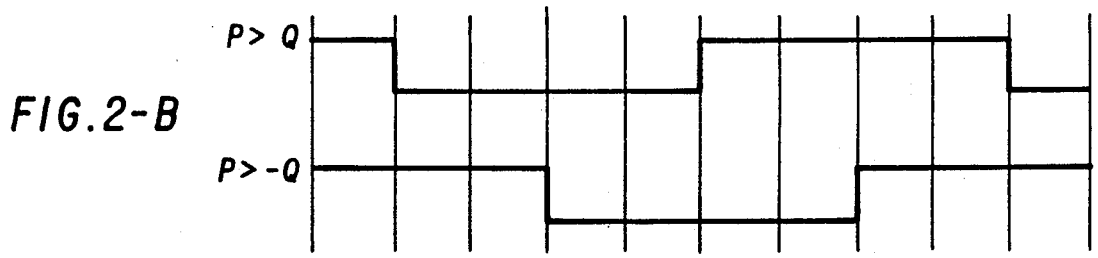
FIG. 2-B
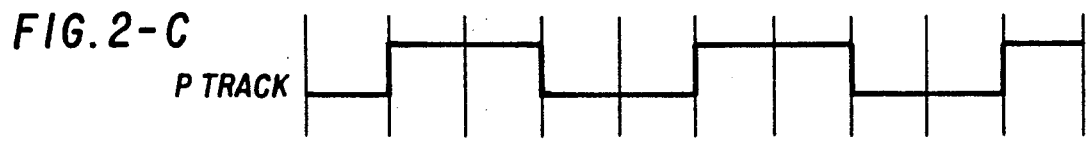
FIG. 2-C
P TRACK
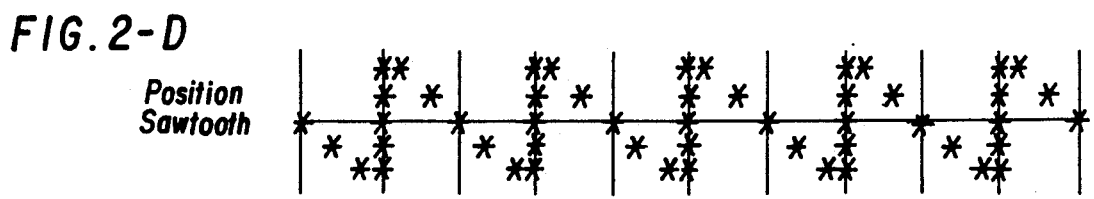
FIG. 2-D
Position Sawtooth
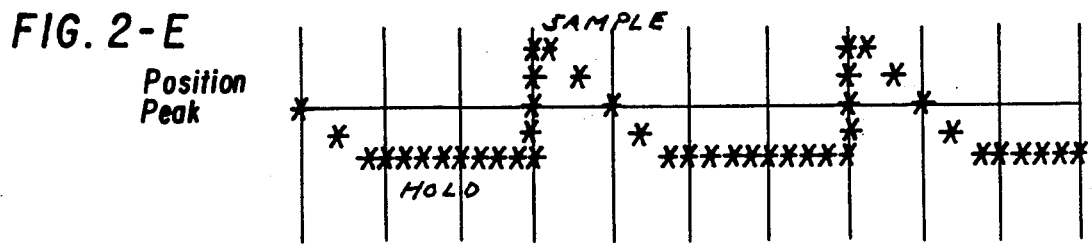
FIG. 2-E
Position Peak

ADJUSTMENT OF POSITION SLOPE FOR DISK DRIVE SERVO USING HALF-TRACK POINT

This application is a continuation of patent application Ser. No. 021, 098, filed Mar. 3, 1987, abandoned.

The purpose of this invention is to provide a method of automatically adjusting the slope of the servo position signals in a disk drive servo control mechanism. The servo position signals are used in a servo system to provide positional and velocity information, these signals are therefore critical to the performance of the servo system and the disk drive.

OLD METHODS

In existing disk drive products the servo position slope is adjusted manually by a technician. The servo mechanism is set to perform a fixed length seek; during the seek, the amplitude of the servo position signals is observed and adjusted using fixed resistors or a potentiometer until the desired amplitude is obtained.

There are several disadvantages to the method described above:

(1) The electronic components used in servo control mechanism are subject to aging and environmental effects.

(2) The adjustment must be repeated periodically or less than optimal servo performance will result (3) The servo system contains many components which affect the amplitude of the servo position signals. If any of these components is replaced, the adjustment procedure must be repeated.

(4) Servo performance actually depends upon the slope of the position signals at the zero crossing points. The peaks of the servo position signals are poorly defined, so adjusting the servo position signals to achieve a defined peak amplitude may not result in a predictable position signal slope.

ADVANTAGES OF THIS INVENTION

The subject novel position slope adjustment method is performed automatically by the machine at each "power-up". The effects of component aging, environment and replacing of servo system components are thereby automatically adjusted-for. The invented method adjusts the amplitude of the position signals at the "half-track point", rather than adjusting the amplitude at the peak. The position signals are more linear at the "half-track point", so this method results in a more accurate adjustment of the position slope.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 2, consisting of A-E, gives typical output signals, idealized, from components of FIG. 1;

DESCRIPTION OF THE PREFERRED EMBODIMENT

Figure 1:
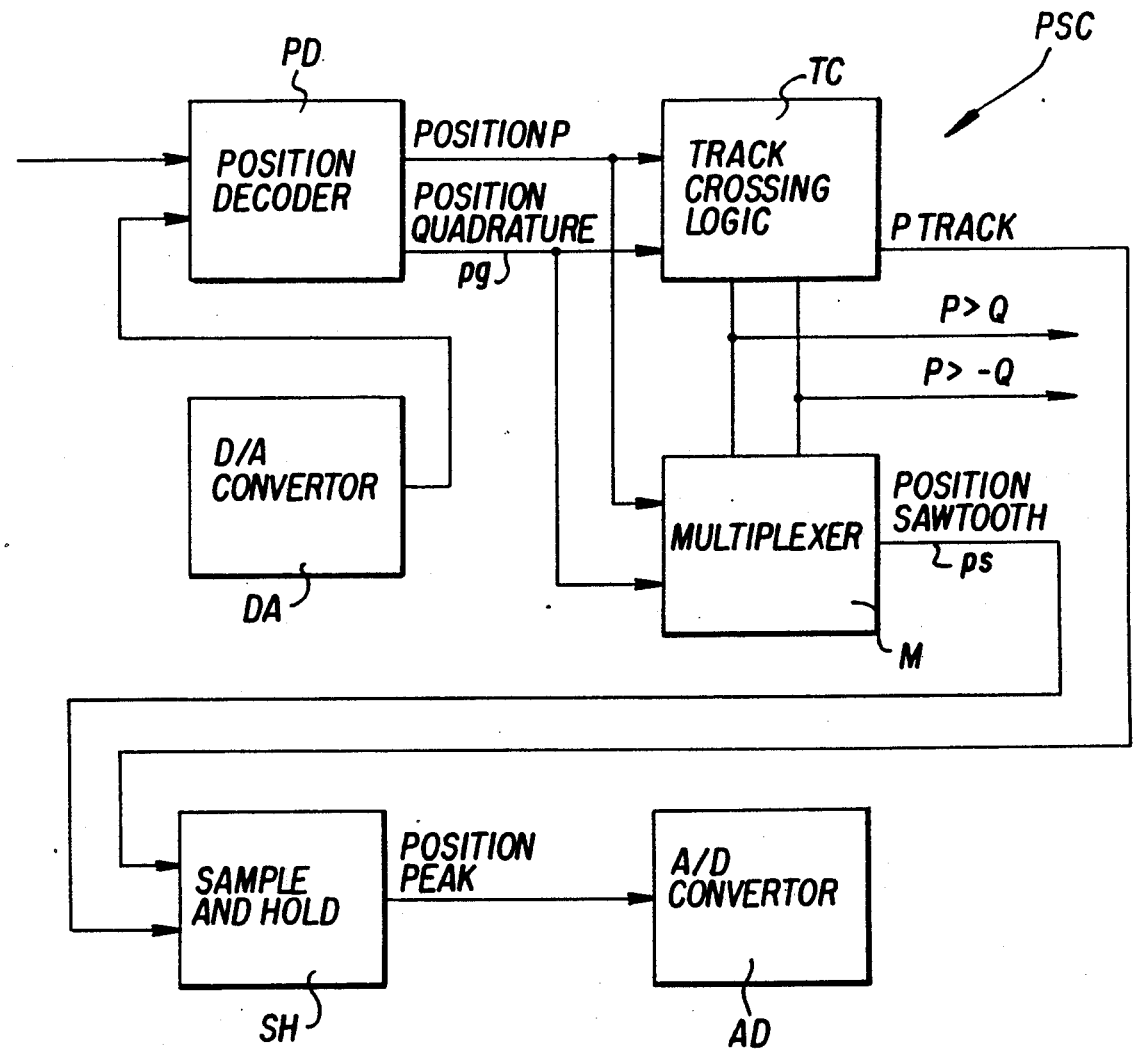
FIG. 1 is a schematic idealized block diagram of a preferred embodiment.

FIG. 1 schematically illustrates a preferred position slope calibration embodiment constructed according to principles of this invention (implemented in the circuits of FIGS. 3-11). This, and other means discussed herein, will generally be understood as constructed and operating as presently known in the art, except where otherwise specified. And, except as otherwise specified, all materials, methods and devices and apparatus herein will be understood as implemented by known expedients according to present good practice.

General Considerations

This invention is applicable to servomechanisms for positioning a transducer at selectable radii on a rotatable information storage disk. Positioning of the transducer is generally achieved by issuing position commands to a transducer positioning servomechanism which responds by moving the transducer to interact with the selected track. Such servomechanisms are known to employ means for providing a plurality of equi-periodic phase-staggered cyclic position indicating signals any one of which is selectable as the position feedback signal in the servomechanism. It has generally been the practice that the position of the transducer relative to the disk has been determined by which one of the position indicating signals is provided as the feedback signal. The transducer therefore has been provided with a plurality of rest positions across the radius of the disk, each one of which is intended to correspond to the transducer being interactive with a selected one of the tracks. It has also been the practice, as track densities (measured in terms of the number of tracks per unit radial distance of the disk) increase, to allow for the provision of a demand signal to the servomechanism so that correction can be made to the position of the transducer as achieved by the provision of one or other of the feedback signals. The higher track densities demand a higher precision in placing the transducer over a track so that the transducer can be prevented from reading from or writing on a data storage track adjacent to the intended track. Various schemes exist whereby a correction signal can be worked out and applied to correct for disk and disk drive mechanical errors and expansion or contraction. These schemes usually involve the use of one or more servo tracks on the disk and rely upon an implied accuracy and predictability of the relative spacing between the plural position indicating signals from the transducer not only at any one radius of the disk but also across the entire surface of the disk where-over the transducer is to be located (see U.S. Pat. No. 4,590,527 to Warner for more details).

As workers know, one must adjust the slope of the demodulated position and quadrature position signals to give correct sensitivity.

The position signals will be understood as used to drive the velocity tachometer, the position loop compensation, the off-track write safety, and the servo-overshoot circuits safety. The accuracy of the slope is of primary importance in establishing how much margin the safety circuits must reserve. The more accurate the slope, the wider and less sensitive the safety "windows" can be and still guarantee correct operation.

The sources of error include the AGC control amplifier and summation network, various amplifier gains and, primarily, the tolerances in the servo head and the servo track read widths. The head width is affected by the flying height as well as the head's magnetic geometry.

A microprocessor will be understood as used for the subject slope adjustment.

The microprocessor needs to have a DAC to set the control voltage. A design is here provided to detect the slope. The candidate design provides the same signal to the microprocessor: increase/decrease setting. Slope adjust will be part of the power-up initializing during the constant speed portion of the REZERO routine. Adjustment will also be taken during the same constant speed portion of a system REZERO. Thus, the adjust system will need to be active during any seek and thereby track changes without a REZERO.

Automatic calibration arrangement, FIG. 1

FIG. 1 shows, in block diagram form, a preferred "position slope calibration" arrangement PSC. Here, it will be understood that a position decoder PD generates position and position quadrature signals from servo information provided by a transducer, as known in the art. Position decoder PD varies the amplitude of the position and position quadrature signals depending on a variable voltage input. The variable voltage input is provided by a digital to analog (D/A) convertor. A track crossing logic stage TC is provided to use the position and position quadrature signals to generate binary track crossing signals P>Q, P>−Q and P track. The track crossing signals and the position and position quadrature signals are fed to a multiplexer M to generate a position sawtooth signal. The position sawtooth signal is produced by multiplexing between the position, position quadrature and their inverses, as known in the art.

The position sawtooth signal is fed to a sample and hold circuit, S/H. The output of the sample and hold circuit is fed to an analog to digital (A/D) convertor. The sample and hold circuit holds the peak value of the position sawtooth which may be perceived as equal to the amplitude of the position and position quadrature signals at the "half track position".

The signals generated in the various parts of the circuit are shown in FIG. 2 [here, understand a "forward seek" across the disk]. The rest positions of the servo system are indicated, in FIG. 2, by the numbers 0, 1, 2, and 3, though, as workers know, many such rest positions exist across a disk surface.

A preferred adjustment method (FIGS. 1, 2)

To describe a recommended position method of slope adjustment with an arrangement as in FIG. 1, please note the following steps (assumed under the control of a microprocessor). Here it will be assumed that the reference voltage going into the AGC control amplifier will be adjusted to change the amplitude (and, therefore, the slope) of the position signals. The slope will be measured, as described below, and the reference voltage altered until the desired slope is achieved.

The approach samples the position signals at "half-track" points where position and quadrature have the same absolute amplitude. The half tracks are very accurately detectable over a few tracks; thus, the voltage at the half tracks will indicate the slope at these known intervals. The D/A convertor is loaded with a prescribed binary value to provide a "nominal" output. The servo actuator is set to move across the disk at a slow speed. At each transition of the P>Q signal the position peak signal is measured using the A/D convertor. At each negative transition of the P>Q the last two values of the position peak signal are averaged and compared to the ideal value for the position peak signal. [The position peak measurements are averaged to eliminate the effect of dc offsets in the position and position quadrature signals].

The binary value in the D/A convertor is then adjusted to increase or decrease the amplitude of the position signals as appropriate.

Such measurement-adjustment is repeated as the servo actuator continues to move across the disk, until the position peak signal has been adjusted to the ideal value.

As a check on the integrity of adjustment, the same apparatus may be used to scan across the disk and check the amplitude of the position peak signal.

ALTERNATE METHODS

The method described was in terms of specific signals (P>Q, position sawtooth and position peak); other signals could have been used to achieve the same effect, as workers will perceive. The method has been described in terms of a quadrature positioning system; however, it is also applicable to nonquadrature systems.

FIGS. 3–11 illustrate a preferred circuit implementation of the system described. FIG. 13 is a block diagram of an overall servo system apt for using this embodiment.

Key features of this invention are that:

(1) The position slope adjustment is performed automatically by the machine without manual intervention.

(2) The adjustment is done by adjusting the amplitude of the position signals at the half track point.

(3) AGC pulse detection from sawtooth; measure amplitude Va and adjust till becomes a reference Vr (e.g. 4 V. peak-to-peak).

Conclusion

It will be understood that the preferred embodiments described herein are only exemplary, and that the invention is capable of many modifications and variations in construction, arrangement and use without departing from the spirit of the invention. Further modifications of the invention are also possible. For example, the means and methods disclosed herein are also applicable to other high density disk files, as well as to related systems. Also, the present invention is applicable for enhancing other related servo systems.

The above examples of possible variations of the present invention are merely illustrative. Accordingly, the present invention is to be considered as including all possible modifications and variations coming within the scope of the invention as defined by the appended claims.

What is claimed is:

1. A method of automatically adjusting the slope of position servo signals in a servo control mechanism, wherein position signal amplitude is adjusted at the "half-track" point rather than at a peak point, this method comprising;

deriving position signals (po) and position quadrature signals (qo) from servo transducer and related processing means;

applying signals po, qo to position decoder means PD adapted to vary the amplitude of these signals according to associated variable input signals provided by D/A convertor means, whereby PD responsively issues modified position signals (p) and position quadrature signals (pq)

applying these signals p, pq to track crossing means TC and to multiplexer means M, with track crossing means TC responsively generating binary track-crossing signals "P>Q" "P>−Q" and "P-track", these also being applied to multiplexer means M, whereupon M responsively generates a position-sawtooth signal ps;

applying sawtooth signals ps to sample-hold means SH adapted to hold the peak value of sawtooth ps, feeding the output of SH to A/D convertor means AD; measuring the amplitude of the position peak signal for each P>Q transition; while retaining n past peak values, averaging these and comparing them with a prescribed reference Vr, to yield an offset value Vo; adjusting the D/A convertor DA to decrease the value of Vo; and repeating the foregoing steps until Vo reaches zero or some prescribed minimum.

2. A method of automatically adjusting the slope of position servo signals in a servo control mechanism, wherein position signal amplitude is adjusted at the "half-track" point rather than at a peak point, this method comprising;

deriving position signals (po) and position quadrature signals (qo) from servo transducer and related processing means;

applying signals po, qo to position decoder means PD adapted to vary the amplitude of these signals according to associated variable input signals provided by d/A convertor means, whereby PD responsively issues modified position signals (p) and position quadrature signals (pq)

applying these signals p, pq to track crossing means TC and to multiplexer means M, with track crossing means TC responsively generating binary track-crossing signals "P>Q" "P>−Q" and "P-track", these also being applied to multiplexer means M, whereupon M responsively generates a position-sawtooth signal ps;

applying sawtooth signals ps to sample-hold means SH adapted to hold the peak value of sawtooth ps, feeding the output of SH to A/D convertor means Ad; measuring the amplitude of the position peak signal for each P>Q transition at the half-track points, and using the result to derive servo signals.

3. A method of automatically adjusting the slope of position servo signals in a servo control mechanism, whereby the amplitude of position signals is adjusted at a "half-track" point rather than at a peak point, this method comprising:

deriving position signals po and position-quadrature signals (qo) with Decoder means; and processing these via track-crossing means to generate track crossing signals P>Q, P>−Q and P-track;

further processing these via multiplexer means to generate a position-sawtooth signal ps reflecting occurrence of one-half values of P, −P, Q and −Q; correlating certain of sawtooth signals ps with position-peak values pp; and using values pp for servo control.

4. The combination as recited in claim 3 wherein the magnitude of signals pp is compared with that of a reference to derive the difference as an offset value Vo; and wherein this method is iterated to minimize Vo.

5. The combination as recited in claim 4 wherein D/A means is combined with position-decoder means to so vary the magnitude of signals po, qo, with the output from said decoder means being used to generate said track-crossing signals.

6. The combination as recited in claim 5 wherein said track-crossing signals and said processed position and position quadrature signals are combined to generate said sawtooth signals; and wherein said sawtooth signals are fed to sample-hold means adapted to register peak values of said sawtooth signals.

7. The combination as recited in claim 6 wherein said peak sawtooth values are averaged for n past peaks and this average is compared with Vo; and wherein said d/A means is adapted to reduce the magnitude of the reference voltage and offset value Vo.

8. The combination as recited in claim 7 wherein, after Vo is so reduced to a minimum, a scan is undertaken to check the amplitude of the position peak signal.

9. In a servo control arrangement, a system for automatically adjusting the slope of position servo signals by adjusting signal amplitude at a half-value point rather than at a peak-value point, this system comprising;

Position Decoder means PD adapted to receive position signals po and position quadrature signals qo, derived from a servo transducer and related processing means, decoder means PD being adapted to vary the amplitude of these signals according to associated variable input signals provided by D/A convertor means DA and to responsively issue modified position signals (p) and position quadrature signals (pq); applying these to Track Crossing means TC and multiplexer means M, means TC, M adapted to receive signals p, pq; the track crossing means TC responsively generating binary track-crossing signals "P>Q", "P>−Q" and "P-track", these also being applied to Multiplexer mans M, which is adapted to responsively generate a position-sawtooth signal ps;

Hold means SH adapted to receive sawtooth signals ps and to hold the peak value of sawtooth ps; and output means OM adapted to receive and process the output of means SH, deriving the amplitude of the position peak signal measured for each P>Q transition; and, using this for so adjusting the slope of position servo signals.

* * * * *